(12) United States Patent
Bettis et al.

(10) Patent No.: US 7,308,083 B2
(45) Date of Patent: Dec. 11, 2007

(54) MESSAGE DURABILITY AND RETRIEVAL IN A GEOGRAPHICALLY DISTRIBUTED VOICE MESSAGING SYSTEM

(75) Inventors: Sonny R. Bettis, Lawrenceville, GA (US); Jon S. Plotky, Lawrenceville, GA (US); Ian M. Moraes, Suwanee, GA (US); Philip L. Lowman, Ellijay, GA (US); James H. Spencer, Tucker, GA (US); Hannah W. Wang, Duluth, GA (US)

(73) Assignee: Glenayre Electronics, Inc., Duluth, GA (US)

( * ) Notice: Subject to any disclaimer, the term of this patent is extended or adjusted under 35 U.S.C. 154(b) by 10 days.

(21) Appl. No.: 11/170,459

(22) Filed: Jun. 29, 2005

(65) Prior Publication Data

US 2006/0002520 A1  Jan. 5, 2006

Related U.S. Application Data

(60) Provisional application No. 60/584,046, filed on Jun. 30, 2004.

(51) Int. Cl.
*H04M 1/64* (2006.01)
(52) U.S. Cl. .............................. 379/88.17; 379/88.22; 707/10; 370/352; 709/203
(58) Field of Classification Search ............. 379/88.17, 379/88.22; 707/10; 709/203; 370/352
See application file for complete search history.

(56) References Cited

U.S. PATENT DOCUMENTS

| | | | | |
|---|---|---|---|---|
| 5,915,001 | A * | 6/1999 | Uppaluru ................. | 379/88.22 |
| 6,269,336 | B1 * | 7/2001 | Ladd et al. ................. | 704/270 |
| 6,427,161 | B1 * | 7/2002 | LiVecchi ..................... | 718/102 |
| 6,477,561 | B1 * | 11/2002 | Robsman ..................... | 718/105 |
| 6,600,736 | B1 * | 7/2003 | Ball et al. .................... | 370/352 |
| 6,625,274 | B1 * | 9/2003 | Hoffpauir et al. ........... | 379/229 |
| 7,054,863 | B2 * | 5/2006 | Lasensky et al. .............. | 707/9 |
| 7,184,523 | B2 * | 2/2007 | Dixit et al. .............. | 379/88.17 |
| 2004/0246822 | A1 * | 12/2004 | Wong ............................ | 369/2 |
| 2005/0102354 | A1 * | 5/2005 | Hollenbeck et al. ........ | 709/203 |

* cited by examiner

*Primary Examiner*—Fan Tsang
*Assistant Examiner*—Simon Sing
(74) *Attorney, Agent, or Firm*—Smith Frohwein Tempel Greenlee Blaha, LLC; Robert Blaha; Gregory Scott Smith

(57) ABSTRACT

A message retrieval subsystem comprises a voice extensible mark-up language browser, a message server, and a message library. The VXML browser is configured with an application programming interface that enables a subscriber of a distributed voice messaging service to request a stored message. The message server receives a request to open a connection from a client process operative on the voice extensible mark-up language browser, spawns a thread to enable the connection, uses the thread to queue one or more subscriber requests for respective blocks of audio information, removes and processes the one or more subscriber requests, and uses the thread to forward a retrieved block of audio information to a subscriber. The message library is coupled to the message server and interposed between the message server and a common message store. The upper library isolates the VXML browser from a streaming protocol used to access the stored message.

11 Claims, 15 Drawing Sheets

MESSAGE DURABILITY AND RETRIEVAL IN A GEOGRAPHICALLY DISTRIBUTED VOICE MESSAGING SYSTEM

CROSS-REFERENCE TO RELATED APPLICATIONS

This application claims priority to U.S. provisional application entitled, "Message Durability and Retrieval," filed on Jun. 30, 2004 and accorded application Ser. No. 60/584,046, which is incorporated reference herein its entirety.

This application is related to now abandoned U.S. utility patent application entitled "Distributed IP Architecture For Telecommunication System," filed on Mar. 15, 2005 and accorded application Ser. No. 11/080,744, which is incorporated by reference herein in its entirety.

BACKGROUND OF THE INVENTION

1. Field of the Invention

Systems and methods that relate generally to voice messaging are invented and disclosed. More particularly, systems and methods for managing messages communicated using a voice messaging architecture with geographically distributed components.

2. Related Art

Over the past several decades, voice mail has continued to expand and establish itself as a key element in the successful operations of most businesses. Some voice mail systems consist of components that communicate with each other on the client side of a public switched telephone network (PSTN) and thus, have been geographically co-located. This can be a great disadvantage for companies that have geographically dispersed offices.

In today's global economy, even small businesses may have a need for multiple offices for serving clients, interacting with vendors, or various other reasons. Presently available wide area networks including the Internet support email, video conferencing and other products that allow dispersed business sites appear more seamless and integrated. In addition, wired and wireless telephonic networks provide network-based voice mail services that are used by small business and personal consumers to communicate with others wherever they may be located. Other telecommunication products have been developed to provide voice mail service to small businesses, and other institutions such as schools, hospitals, government offices, and the like. These other telecommunication products generally include local voice message storage.

However, a significant problem that still exists for geographically dispersed offices is providing a telephonic system that operates as a single, co-located system while still serving the specialized needs of the various offices. Establishing a separate data storage facility at each office can be a costly endeavor as duplicative hardware must be purchased and maintained at each site. Furthermore, logistics for enabling inter-office voice mail access can become complex.

A centralized storage facility could reduce cost and provide a seamless voice mail platform. However, integrating a centralized storage facility for voice messages across a geographically disperse enterprise is problematic because of system latency when processing voice messages between remotely located sites. One component of system latency is the time it takes to identify the particular storage medium where the message was stored and correctly position a read/write mechanism proximal to the identified medium. System latency is also affected by the speed and capacity of the underlying network or networks used to couple remotely located sites to the central storage facility.

System latency presents a new challenge. On the one hand, the subscriber desires a reliable and accurate retrieval and playback of a previously stored voice message. On the other hand, requiring the subscriber to wait for delivery of the entirety of the stored voice message prior to initiating playback of the voice message is not desirable. Accordingly, further improvements to geographically disperse voice mail systems are desired.

SUMMARY

An embodiment of a message retrieval subsystem that provides streaming audio in a distributed voice messaging system comprises a voice extensible mark-up language browser, a message server, and a message library. The message server receives a request to open a connection from a client process operative on the voice extensible mark-up language browser, spawns a thread to enable the connection, uses the thread to queue one or more subscriber requests for respective blocks of audio information, removes and processes the one or more subscriber requests, and uses the thread to forward a retrieved block of audio information to a subscriber. The message library comprises an upper library and a lower library. The upper library is communicatively coupled to the message server, interposed between the message server and the lower library, and isolates the voice extensible mark-up language browser from a streaming protocol used to access a stored message.

Related methods of operation are also provided. An embodiment of a method for providing streaming audio information in a distributed voice messaging system comprises providing a voice extensible mark-up language browser on a media server, providing a message server on a document server communicatively coupled to the media server and a common message store configured with message information, receiving a request to open a connection between the voice extensible mark-up language browser and the message server, spawning a connection thread for processing a subsequent request for information stored in the common message store, receiving the subsequent request for information, using the connection thread to queue the subsequent request, using a worker thread to remove and process the subsequent request, and using the connection thread to forward a response to the voice extensible mark-up language browser.

Other features and advantages of the systems and methods for message durability and retrieval will be or become apparent to one with skill in the art upon examination of the following figures and detailed description. All such additional features and advantages are within the scope of the systems and methods for message durability and retrieval in a geographically distributed messaging system as protected by the accompanying claims.

BRIEF DESCRIPTION OF THE FIGURES

The systems and methods for message durability and retrieval can be better understood with reference to the following figures. The components within the figures are not necessarily to scale, emphasis instead being placed upon clearly illustrating the principles of message durability and retrieval in a geographically distributed messaging system. Moreover, in the figures, like reference numerals designate corresponding parts throughout the different views.

DETAILED DESCRIPTION

Various embodiments of a distributed messaging system that provides functionality to support modern small or large office business settings with telecommunication system options, such as call forwarding, auto-attendant, voice mail, voice messaging, etc. will be described with respect to FIGS. 1-10B. The distributed messaging system is made up of components that can be located in various locations that are remote from each other. Each of the components is coupled to an Internet protocol (IP) based wide-area network. The system provides message storage assurance to subscribers and enables a caller to generate a message and terminate the communication with a voice recorder without having to wait on-the-line for a confirmation that the voice message was successfully delivered and stored. The system also provides message durability in that once the voice message is recorded, the system ensures that despite device and network service outages, the voice message is saved in the common message store. Moreover, the system provides the capability to stream message files from the common message store to a VoiceXML (VXML) browser on a media server.

An exemplary embodiment of a message retrieval subsystem comprises a media server, a document server, and the common message store. A message server resides on the document server. The message server acquires voice information blocks by invoking functions provided by a message library. The message server also supplies a socket connection for the VXML browser operative within the media server. The VXML browser receives the voice information blocks through the socket connection. The message library exposes the common message store to the message server while hiding the streaming protocol from the VXML browser. The message library comprises an upper library and a lower library. The multi-layered architecture of the message library enables the integration of multiple message stores with the document server.

Having described the general structure and operation of an exemplary message retrieval subsystem, various embodiments of the underlying distributed messaging system will be described with respect to FIGS. 1-10B. Thereafter, discussion will address the functionality and architecture of the exemplary message retrieval subsystem with respect to FIGS. 11 and 12.

Figure 1:
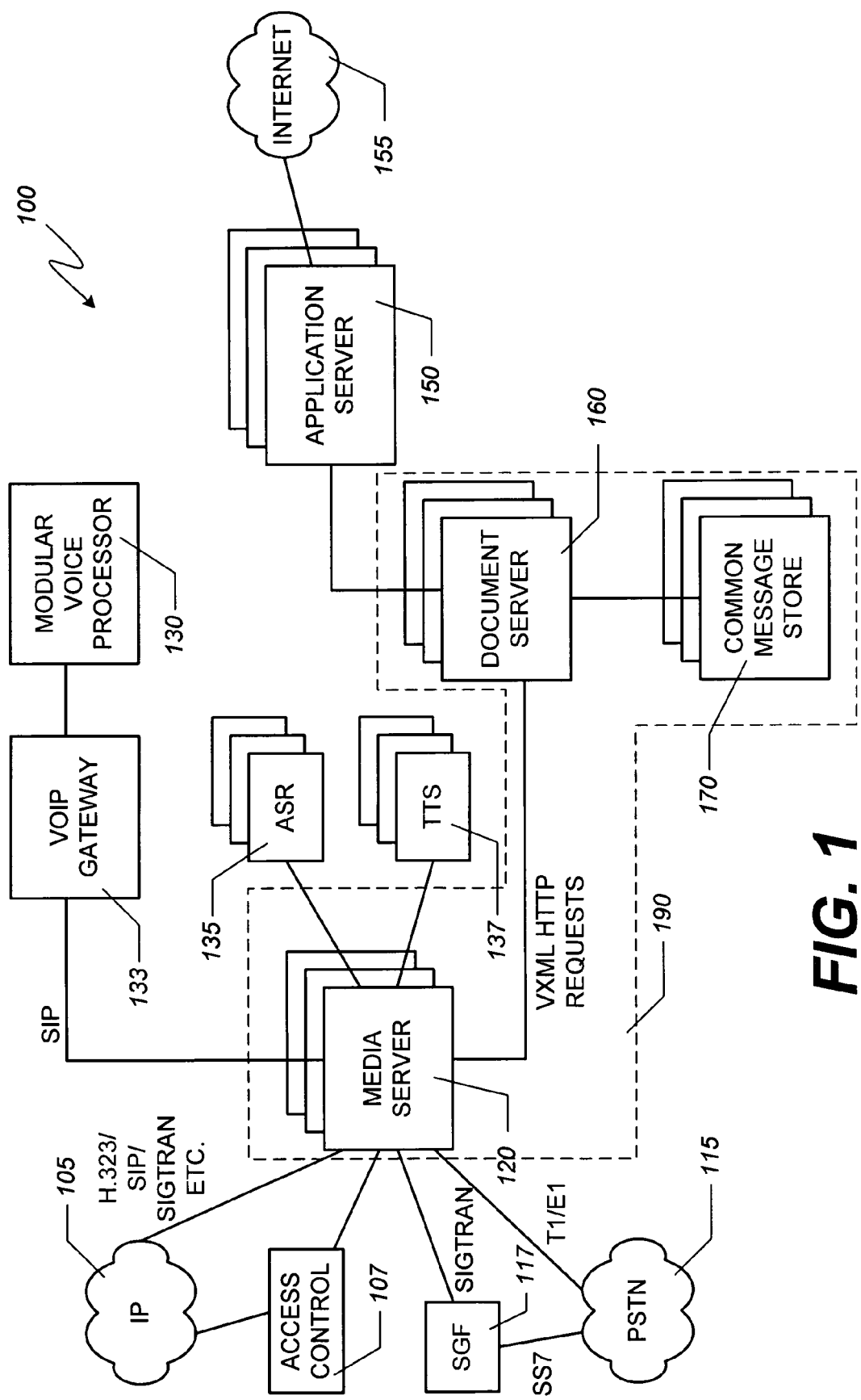
FIG. 1 is a block diagram illustrating an embodiment of geographically distributed messaging system.

FIG. 1 is a block diagram illustrating an embodiment of geographically distributed messaging system. The geographically distributed messaging system 100 provides for message storage assurance, durability, and retrieval of voice messages using a media server 120, document server 160, and a common message store 170. Media server 120 couples the distributed messaging system 100 to one or more networks. Document server 160, located remotely from the media server 120, manages storage of voice messages in common message store 170. The complexities of interfacing to telecommunications networks such as the public switched telephone network (PSTN) 115 are handled through a signaling gateway function (SGF) 117 coupled between media server 120 and PSTN 115 with SigTran protocol used in the link between media server 120 and SGF 117 and signaling system 7 (SS7) is used to perform out-of-band signaling in support of the call-establishment, billing, routing, and information-exchange functions between SGF 117 and PSTN 115. As illustrated in FIG. 1, media server 120 is also coupled to PSTN 115 via T1/E1 or other multiple channel links.

A voice over IP (VOIP) gateway 133 integrates the media server 120 with a modular voice processor 130 or other devices that use session initiation protocol (SIP). Access control 107 manages the complexities of integrating multiple media servers 120 with Internet protocol (IP) network 105. When a single media server 120 is used, a communication link using SIP, SigTran, or the H.323 messaging protocols couples media server 120 to IP network 105. One or more automatic-speech recognition (ASR) modules 135 and one or more text-to-speech (TTS) conversion modules are coupled to media server 120 to enable both audio and text input and output to/from distributed messaging system 100. A voice over IP (VOIP) gateway 133 integrates the media server 120 with a modular voice processor 130 or other devices that use session initiation protocol (SIP). A simplified protocol is used for communications between the remaining components of the distributed messaging system.

Voice extensible markup language (VoiceXML or VXML) is one mode of communication between media server 120 and remotely located document server 160. VXML, which uses hypertext transfer protocol (HTTP) to communicate information in packets, allows a user to interact with devices coupled to IP networks using voice-recognition technology. Instead of a traditional graphical user interface based browser, VXML relies on a voice browser and/or any of a plethora of voice-based devices such as telephones, mobile phones and combination devices. Instead of a traditional browser that relies on a keyboard and a mouse, VXML relies on a voice browser and a voice-based device. Using VXML, the user interacts by listening to audio output that is either pre-recorded or synthesized and submits input through the user's natural speaking voice or a touch-tone keypad. VXML is designed for creating audio dialogs that feature synthesized speech, digitized audio, and recognition of spoken and dual-tone multiple frequency encoded inputs, recording of voice messages, and mixed conversations. As will be explained in further detail below, VXML HTTP requests are communicated from media server 120 to document server 160, which manages the storage, confirmation, and retrieval of voice messages saved in common message store 170.

Application server 150, coupled to document server 160 and Internet 155, provides a mechanism for subscribers of the distributed messaging system and third-parties with proper access privileges to access previously stored voice messages from common message store 170.

Messages are durable when once a subscriber records a message in a VXML session, the message is saved and accessible via a common message store remotely located from the subscriber despite media server 120 failures, document server 160 failures and wide area network service outages. This is accomplished because message storage from a local data store to the remotely located common message store can be asynchronous. That is, the subscribing caller does not need to wait on-the-line for acknowledgement of a successful transfer of the message. Because the common message store comprises an array of disks, the messages and metadata stored therein can survive numerous device failures and request restarts for transfers of message blocks.

As further illustrated in FIG. 1, a message retrieval subsystem 190 comprises media server 120, document server 160, and common message store 170. As will be explained in further detail below, various elements distributed across these components are used to form a channel that supports the transfer of audio information from the common message store to a subscriber of services provided by the distributed messaging system 100.

Figure 2:
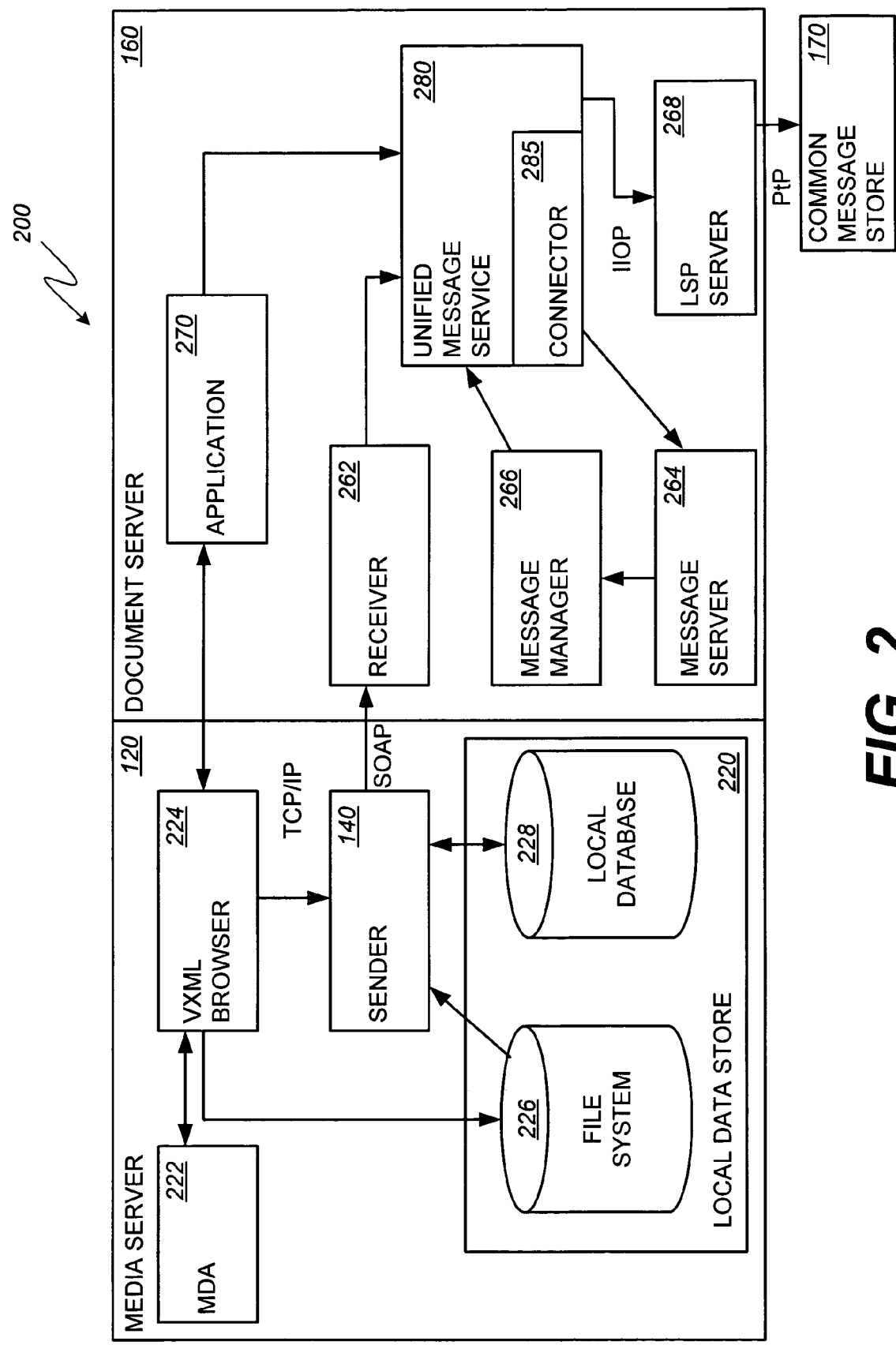
FIG. 2 is a block diagram illustrating an embodiment of a message durability subsystem that can be implemented within the distributed messaging system of FIG. 1.

FIG. 2 is a functional block diagram illustrating an embodiment of a message durability subsystem 200 that can be implemented within the distributed messaging system 100 of FIG. 1. The message durability subsystem 200 comprises media server 120, document server 160, and common message store 170. Media server 120 comprises a message deposit application 222 coupled to VXML browser 224. Message deposit application 222 prepares and controls the media server 120 to enable message recording. VXML browser 224 is further coupled to sender 140 and local data store 220. VXML browser 224 communicates with sender 140 via TCP/IP. Local data store 220 comprises file system 226, which provides a filename and path to associate with the actual voice data and database 228, which saves and associates metadata with a recorded voice message.

Sender 140 communicates requests to document server 160 via simple object access protocol (SOAP). Sender 140 provides a socket connection for VXML browser 224. The socket connection can be accessed by multiple languages using multiple computing platforms. Request information transferred to the document server 160 includes attachment file path and name, message type identifier, message status identifier, time for delivery, originator identifier, and identifiers for one or more recipients. Sender 140 is configured to save the request including message request delivery state information into local data store 220, send message header information (metadata) together with the attachment file to the document server 160, delete the request and delivery information when the message has been successfully delivered to the document server 160, and retry delivery for messages that are not successfully delivered.

Document server 160 comprises receiver 262, message server 264, message manager 266, unified message service 280, layered service provider server 268, and application 270. Receiver 262 is configured to receive the SOAP requests from sender 140, retrieve the message information and attachments, invoke the unified message service to create a Java message service message and save the created message in message server 264 persistently. Receiver 262 is further configured to handle SOAP fault reporting when data transfer errors occur. Unified message service 280 communicates with message server 264 via connector 285. Message server 264 provides persistent storage to the message and related data on the document server 160, asynchronous message delivery, ensures once-and-only-once delivery of the message to the common message store 170, and deletes the message when the message has been successfully stored in the common message store 170. Message manager 266 gets messages from the message server 264, then forwards them to the common message store 170 using the link provided by the unified message service application interface and the layered service provider server 268. Message manager 266 is configured to status the message server 264 regarding whether the message was successfully delivered to the common message store 170. Message manager 266 is further configured to retry message delivery for messages that were not successfully uploaded and integrated with the common message store 170.

Two approaches for providing message attachment are contemplated. The first approach is that the attachment content of the SOAP message received by the receiver 262 is delivered to the message server 264 together with the header information or metadata as one Java message service compatible message without writing to an intermediate file. Using this approach, the receiver 262 and the message server 264 have the flexibility to be distributed so that any document server is able to deliver a message stored in the message server 264 to the common message store.

The alternative approach is that the attachment content of the SOAP message received by receiver 262 is saved into a file, then the file name and message metadata are delivered to the message server 264. Using this approach, the message server 264 handles text data only.

Application server 270, interposed between unified message service 280 and VXML browser 224, exposes previously stored messages to one or more subscribers communicatively coupled to media server 120.

Figure 3:
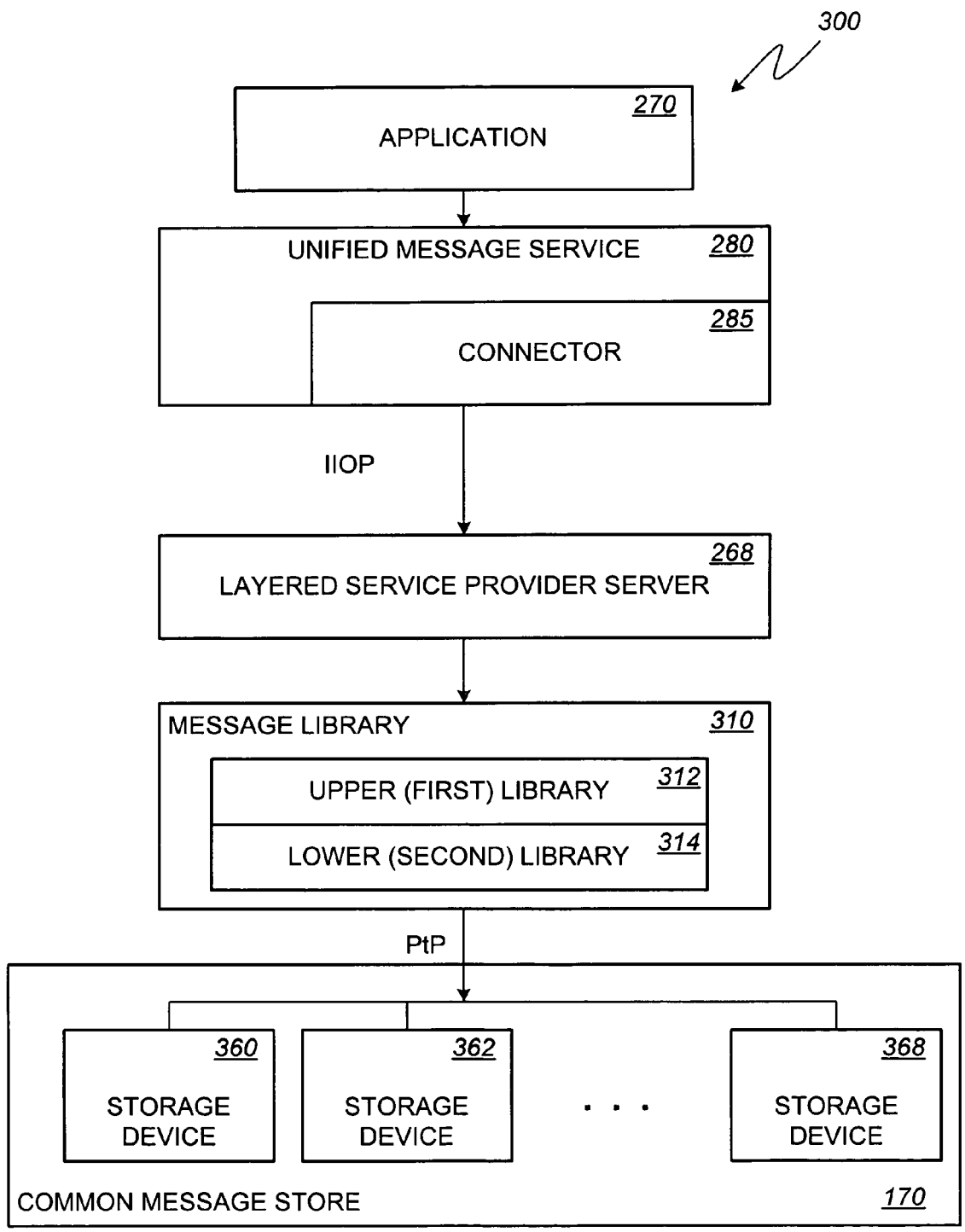
FIG. 3 is a functional block diagram of an embodiment of a message channel from the document server to the common message store of the message durability subsystem of FIG. 2.

FIG. 3 is a functional block diagram of an embodiment of a message channel 300 that links document server 160 to the common message store 170 of the message durability subsystem 200 of FIG. 2. As indicated in FIG. 3, application 270, operable on or in communication with document server 160, is coupled via unified message service 280 and a layered service provider (LSP) server 268 to a message library 310 that includes an upper library 312 and lower library 314. The unified message service 280 includes a connector 285 configured as a common object request broker architecture (CORBA) client. Layered service provider server 268 is configured as CORBA server. Layered service provider server 268 provides a robust, efficient and scalable message and subscriber preference adjustable service. Connector 285 communicates with layered service provider server 268 via Internet Inter-ORB protocol (IIOP). Upper library 312 is a high-level application interface that encapsulates device-specific logic in lower library 314. Upper library 312 includes multiple functions for supporting messaging services. Lower library 314 uses a peer-to-peer protocol to communicate with storage device 360, storage device 362, and storage device 368 and additional storage devices (not shown) under the management and control of common message store 170.

Figure 4:
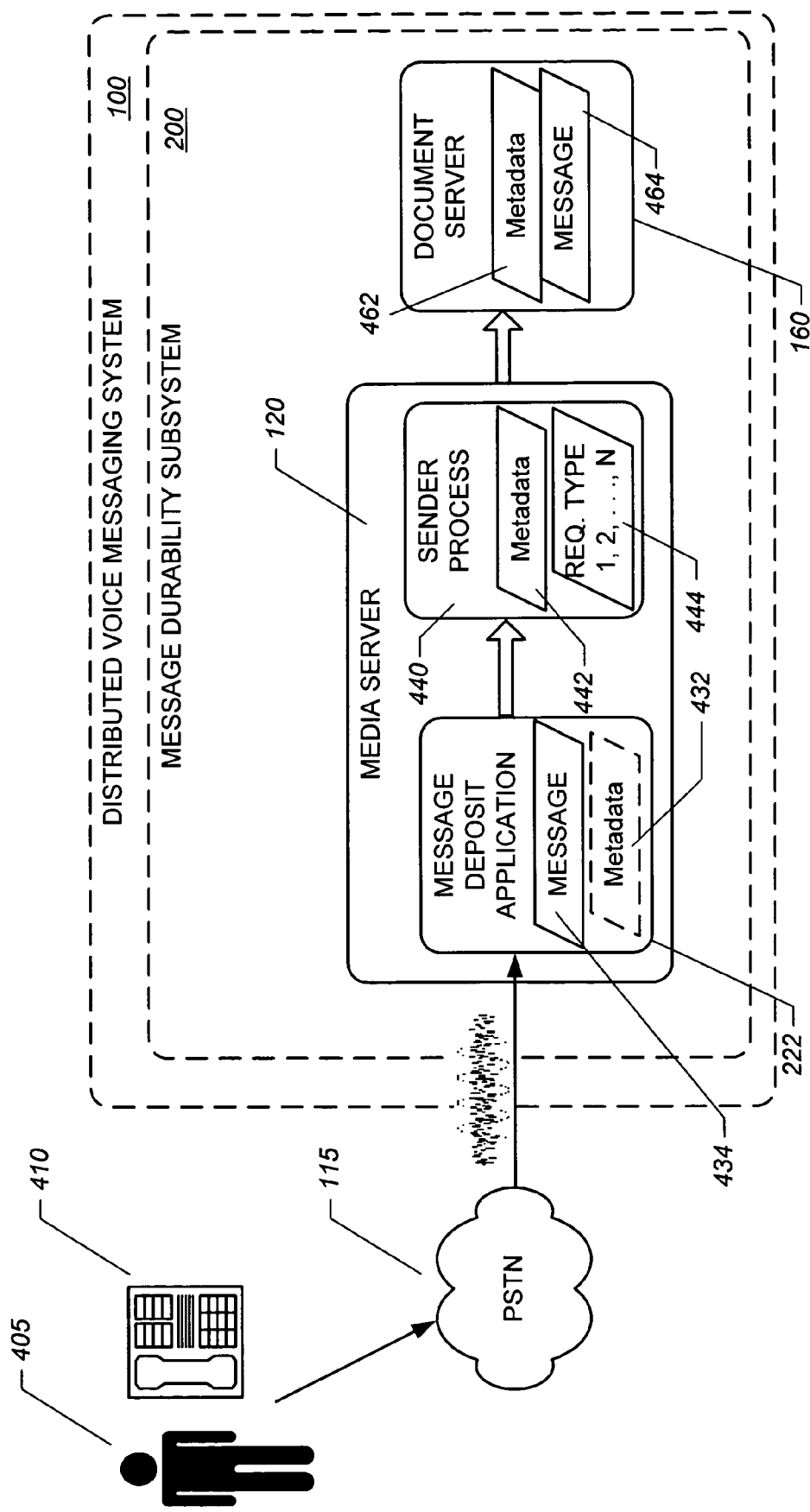
FIG. 4 is a schematic diagram illustrating an embodiment of the distributed messaging system of FIG. 1 when a subscriber generates a voice message.

FIG. 4 is a system diagram illustrating the components and data flow within the distributed messaging system 100. Distributed voice messaging system 100 includes a message durability subsystem 200, which comprises media server 120, document server 160, and a common message store (not shown). The media server 120 can be configured with internal and or externally coupled data storage devices used to provide the previously introduced file system 226 and local data store 228 functions. Media server 120 is communicatively coupled to remotely located document server 160 via a packet-switched wide area network. Media server 120 is further coupled to PSTN 115.

In operation, subscriber 405 initiates a call with a telephone 410 at a location coupled to PSTN 115. The call is established over PSTN 115 and terminated by media server 120, which provides the telephony interface between PSTN 115 and distributed messaging system 100. Message deposit application 222, operable within media server 120, generates a new filename for the message about to be recorded and collects or otherwise generates new metadata 432 in accordance with one or more identifiers used to classify or otherwise describe the nature of the call, subscriber, and the voice message. Metadata 432 is associated with the filename.

The message deposit application 222 addresses the VXML browser 224, sender 140, file system 226, and local data store 228 to ensure the media server 120 is prepared to record the voice message. If any of these devices reports a non-ready condition to the message deposit application 222, the message deposit application 222 immediately informs the subscriber 405 that a system failure has occurred that the message cannot be recorded and aborts the recording process. Otherwise, if each of the media server devices is ready, voice message 434 is recorded and temporarily stored within media server 120. Thereafter, the subscriber 405 can access other system functions or terminate the call without waiting for acknowledgment that the voice message 434 has been saved in the common message store 170.

The message deposit application 222 in accordance with a self-generated initialization trigger or an externally generated signal forwards a request to sender process 440 to forward the data to remotely located document server 160. Sender process 440 accepts the request 444, saves the request 444 and metadata 442 in a local database, and forwards the request 444 via an IP based network to a receiver associated with the document server 160. The document server 160, in turn saves a received copy of metadata 462 and message 464 in a common data store 170 (not shown).

Figure 5:
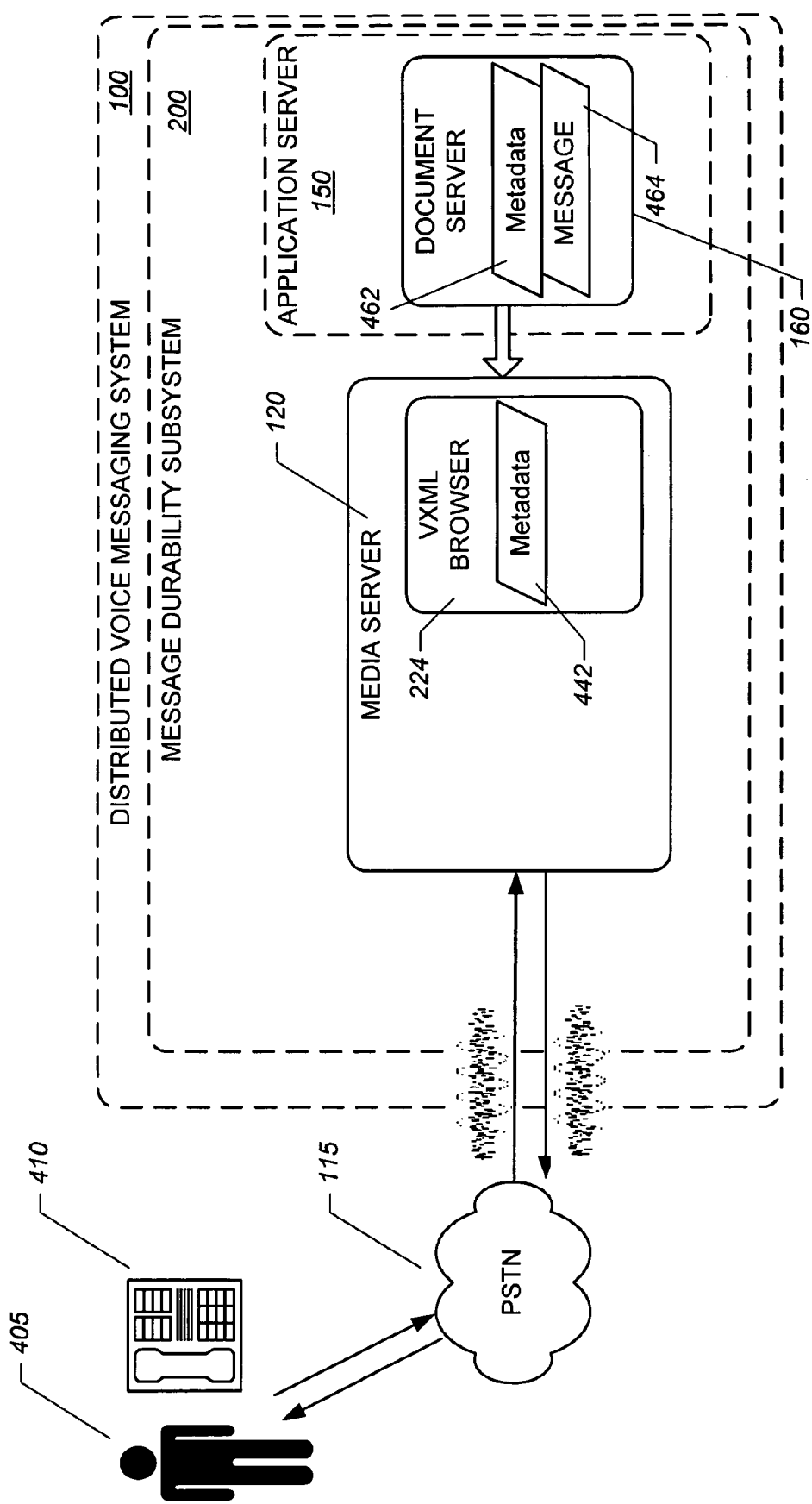
FIG. 5 is a schematic diagram illustrating an embodiment of the distributed messaging system of FIG. 1 when a subscriber retrieves a voice message.

FIG. 5 is a schematic diagram illustrating an embodiment of the distributed messaging system of FIG. 1 when a subscriber retrieves a voice message. As indicated by the illustrated embodiment, document server 160 may be associated with or controlled by various applications operable on application server 150. Thus, a subscribing user with appropriate access to an IP based network that is coupled to application server 150 can access, review, comment, and forward previously stored voice messages integrated via document server 160 in common message store 170. In addition to providing access to subscribers via application server 150, previously stored voice messages can be returned to a subscribing caller 405 coupled to the distributed voice messaging system 100 via PSTN 115. One or more applications operable on or in communication with document server 160 can return voice messages via VXML browser 224 associated with media server 120.

Figure 6:
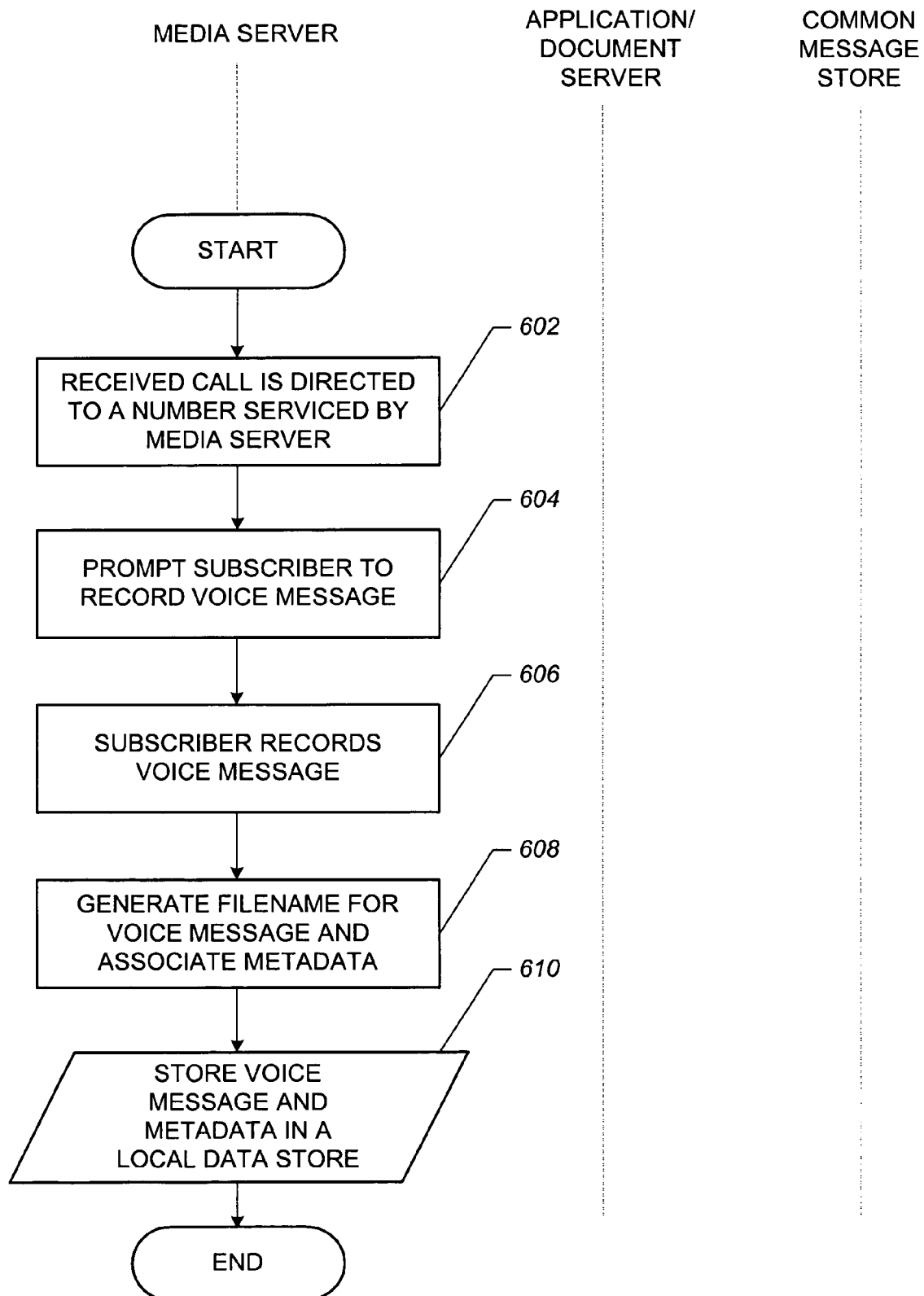
FIG. 6 is a flow diagram illustrating an embodiment of a method for generating and locally storing a voice message.

FIG. 6 is a flow diagram illustrating an embodiment of a method 600 for generating and locally storing a voice message. As described above, the media server 120 is configured to record and locally store incoming voice messages. Media server 120 provides the locally stored voice messages to document server 160 at an appropriate time for transfer to common message store 170. Media server 120 is configured with appropriate processing resources to concurrently store one or more incoming voice messages in a local data store coupled to the media server 120, while allowing access to previously stored "local" voice messages.

Method 600 begins with block 602 where a call, originated by a subscriber of the distributed voice messaging system 100 (FIG. 1) is serviced by media server 120. Next, as indicated in block 604, the subscriber is prompted to record a voice message at some time during the call. The subscriber records the voice message, as shown in block 606. Thereafter, media server 120 generates a filename for the voice message and associates appropriate metadata for identifying the voice message, as indicated in block 608. After the voice message has been recorded, the filename, voice message and any header information, such as metadata is stored in a local data store 228, as indicated in input/output block 610.

Metadata associated with the voice message includes storage location, type, caller, session, urgency, and confidentiality identifiers. The local storage location identifier contains an absolute path and filename of the data file on local file system 226. The type identifier indicates whether the processed message is a voice or a fax message. The caller identifier indicates a subscriber identification if the message depositor is a subscriber of the system. Otherwise, the caller is identified as a "guest." The session identifier indicates a depositor session identification. The urgency identifier indicates whether the associated message is a high priority message or a standard priority message that may be processed and addressed in due course. The confidentiality identifier indicates whether the message is designated for access to a limited number of recipients. Metadata associated with the voice message also identifies the message sender and one or more message recipients.

Additional and optional metadata associated with a voice message may include information indicative of a preferred date and time for delivery. When not associated with the message the media server 120 is configured to periodically initiate the transfer of a new message to common message store 170.

Conditional metadata is also associated with some messages processed by the distributed messaging system 100. For example, conditional metadata identifies when the stored voice message is a comment referring to an attached forwarded message. In addition to a forwarded message identifier, conditional metadata includes forwarded message note and dictation length identifiers. The forwarded message identifier is the message identifier associated with the forwarded voice message. The forwarded message note identifier is a separate identifier associated with a note or comment regarding the forwarded message. The dictation length identifier indicates the length of the forwarded message associated with the note.

Figure 7:
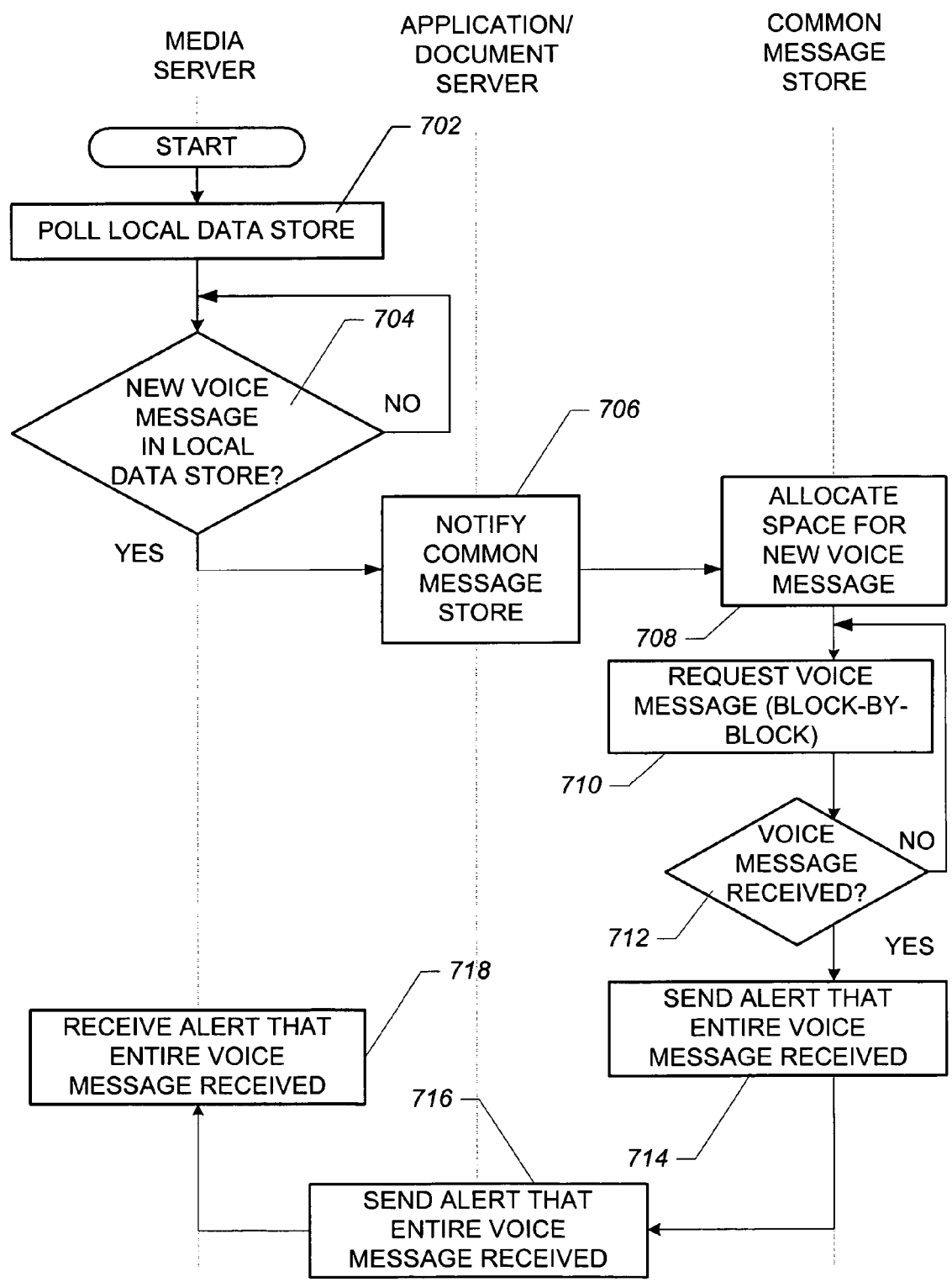
FIG. 7 is a flow diagram illustrating an embodiment of a method for message storage assurance that can implemented using the distributed messaging system of FIG. 1.

FIG. 7 is a flow diagram illustrating an embodiment of a method for message storage assurance 700 that can be implemented using the distributed messaging system 100 of FIG. 1. The method for message storage assurance 700 involves forwarding the locally-recorded and stored messages at the appropriate time to the common message store 170 and sending confirmation back to the media server 120 that the message has been stored. The method for storage assurance 700 begins with block 702 by polling the local data store associated with the media server 120 for new voice messages 434. When a new voice message 434 has been detected, as indicated by a positive response from query 704, the media server 120 provides an indication to the document server 160, which in turn, notifies the common message store 170 in block 706 of the presence of the new message.

As indicated in block 708, the common message store prepares space for the new voice message designated for integration in common message store 170. Next, as shown in block 710 and query block 712, common message store 170 requests message content using a block-by-block repetitive process until the entire message has been delivered via the document server 160 and received in the common message store 170. Once the entire message has been received, common message store 170 sends an acknowledgement that the entire message has been received, as shown in block 714. The acknowledgement issued from the common message store 170 is received and forwarded by document server 160 as shown in block 716. The acknowledgement received by document server 160 is forwarded to the media server 120 as shown in block 718. The acknowledgement received by media server 120 confirms that the voice message has been successfully stored and integrated with common message store 170. In an alternate embodiment, polling for new messages in the local data store 228 associated with the media server 120 may be performed by software or firmware operable within the document server 160 or by an application in communication with document server 160. In this way, one or more remotely located devices can be configured to monitor multiple media servers.

Figure 8A:
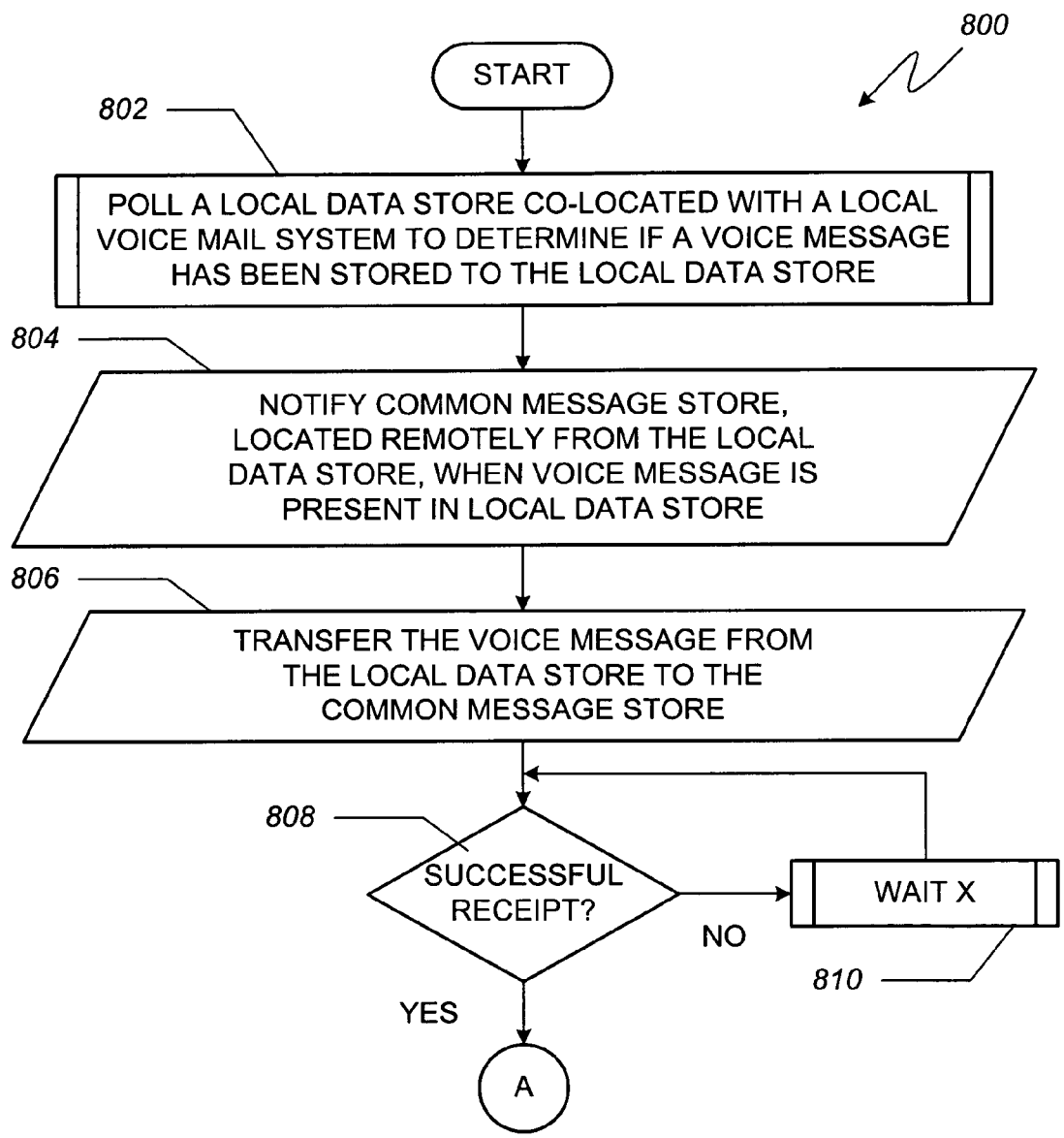
FIGS. 8A and 8B are a flow diagram illustrating an alternative embodiment of a method for message storage assurance that can implemented using the distributed messaging system of FIG. 1.
Figure 8B:
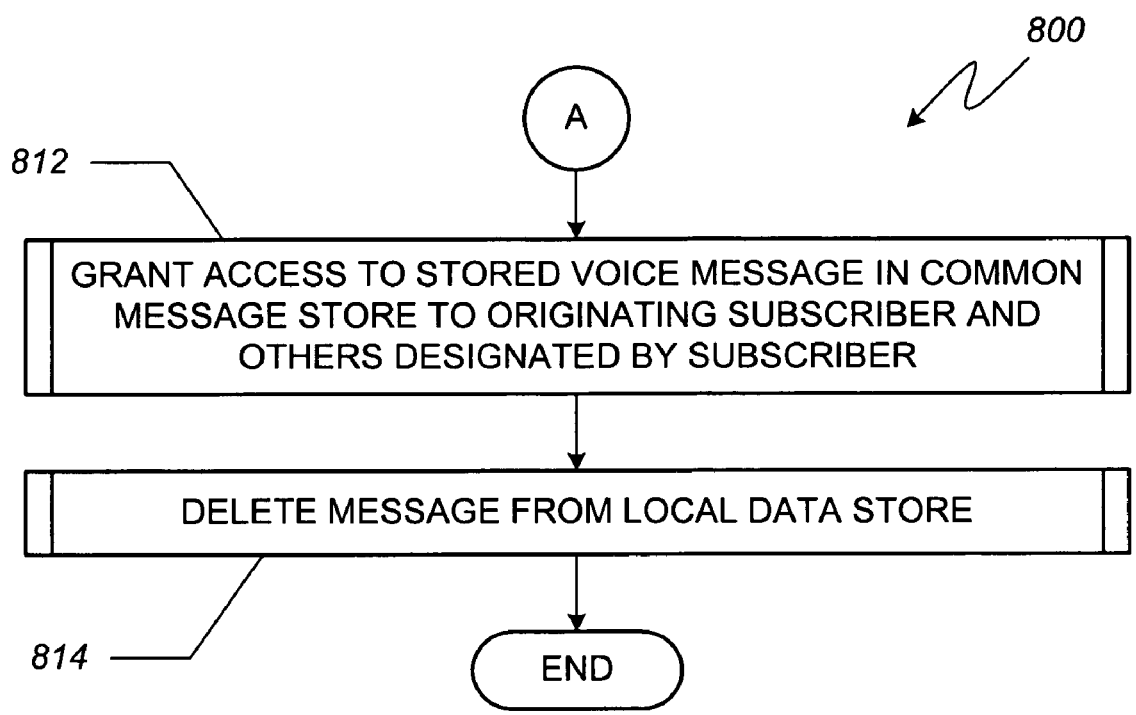

FIGS. 8A and 8B are a flow diagram illustrating an alternative embodiment of a method 800 for message storage assurance that can implemented using the distributed messaging system 100 of FIG. 1. Method 800 begins with block 802 where a local data store 228 co-located with a local voice mail system is polled to determine if a voice message has been stored to the data store 228. Thereafter, as indicated by input/output block 804, the common message store 170 is notified that a new voice message is present in the (remotely located) local data store 228. Next, the voice message is transferred to the common message store 170 from the local data store 228 as illustrated in input/output block 806. A query 808 and an associated wait process 810 are repetitively performed until the voice message has been successfully stored in its entirety in the common message store 170. At this point, the voice message has been stored in the common message store 170. As indicated by connector A, which associates the steps illustrated in FIG. 8A with those shown in FIG. 8B, method 800 continues with block 812 where the stored voice message is made available to the subscriber and those with access privileges that are communicatively coupled to the document server 160 and common message store 170. In block 814, the message stored in the local data store 228 is deleted. The functions illustrated in blocks 812 and 814 may be performed out-of-sequence or substantially simultaneously.

Figure 9A:
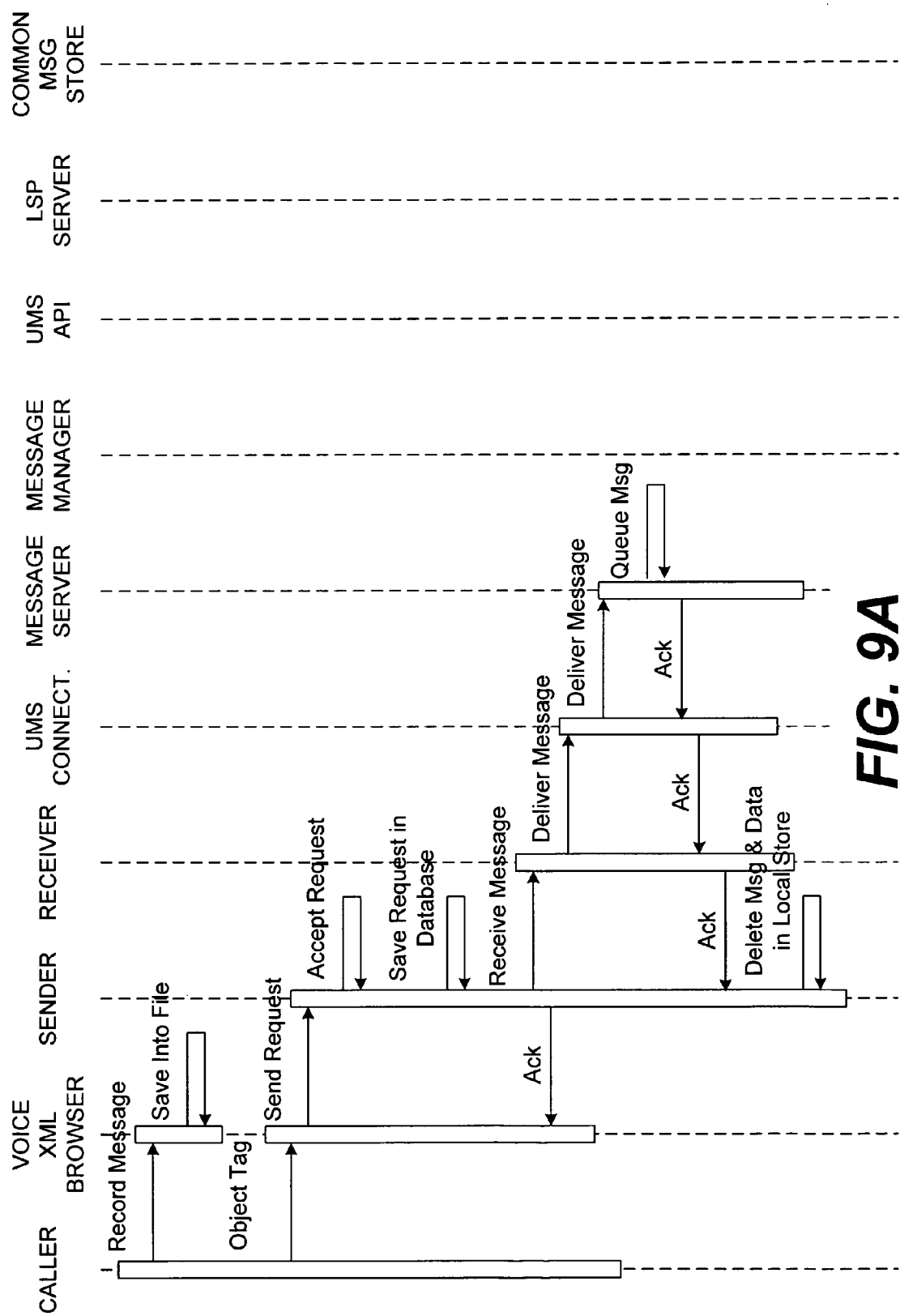
FIGS. 9A and 9B are a datagram illustrating an embodiment of message flow through the system of FIG. 1 during a message store.
Figure 9B:
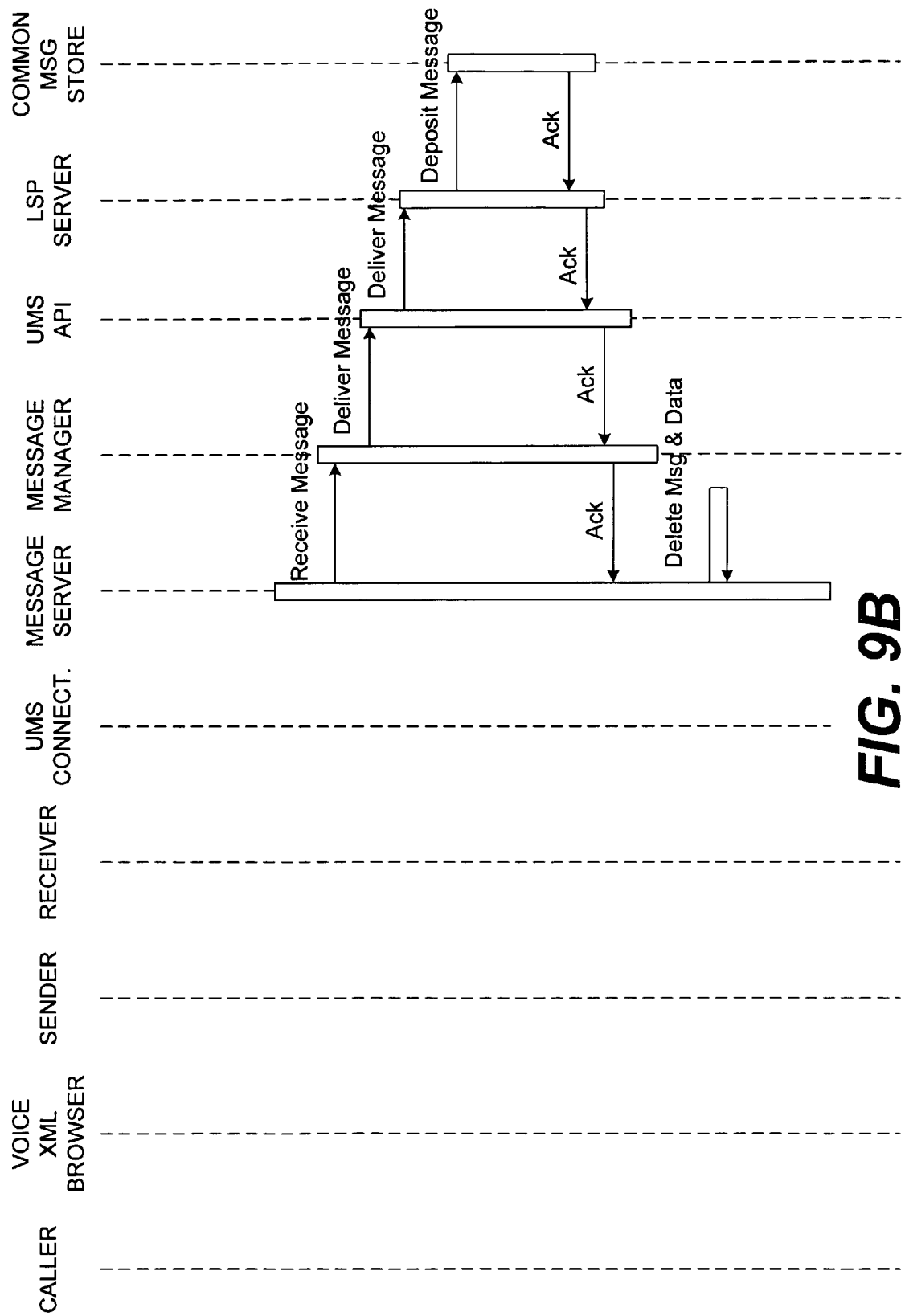

FIGS. 9A and 9B are a datagram illustrating an embodiment of message flow through the distributed message system 100 of FIG. 1 during a message transfer from local data store 228 to common message store 170. As shown in the sample embodiment, a host of communications are sent and received by various system entities. A caller device both records a message and forwards an object tag to a VXML browser. The VXML browser saves or otherwise associates the recorded message into a file and sends a request to temporarily store the message in the local data store. A sender process accepts the request, saves the request in a local database, forwards the request to a receiver associated with the document server 160. The receiver delivers the message via a unified message service to a message server. The message server queues the message request, receives, and forwards the message to a message manager. The message server retains the message and associated metadata until it receives an acknowledgement from the message manager that the message has been successfully processed into the common message store. In the illustrated embodiment, once the message server queues the message, an acknowledgement is forwarded to the VXML browser via the unified message service connection, receiver, and sender in that order. When the sender receives the acknowledgement that the message has been queued in the message server, the sender deletes the message and associated data that were temporarily stored in the local data store. In an alternative embodiment, the acknowledgement stream from the message server to the VXML browser may be withheld or otherwise delayed until the message server receives a positive acknowledgment from the common message store.

The message manager receives the message from the message server and forwards the message to a unified message service application interface, which in turn forwards the message via a LSP server that deposits the message in the common message store 170. Once the common message store has successfully deposited the message, an acknowledgement message identified by the associated message identifier is forwarded to the message server via the LSP server, unified message service application interface and message manager, in that order. In response, the message server deletes the message and associated metadata.

Figure 10A:
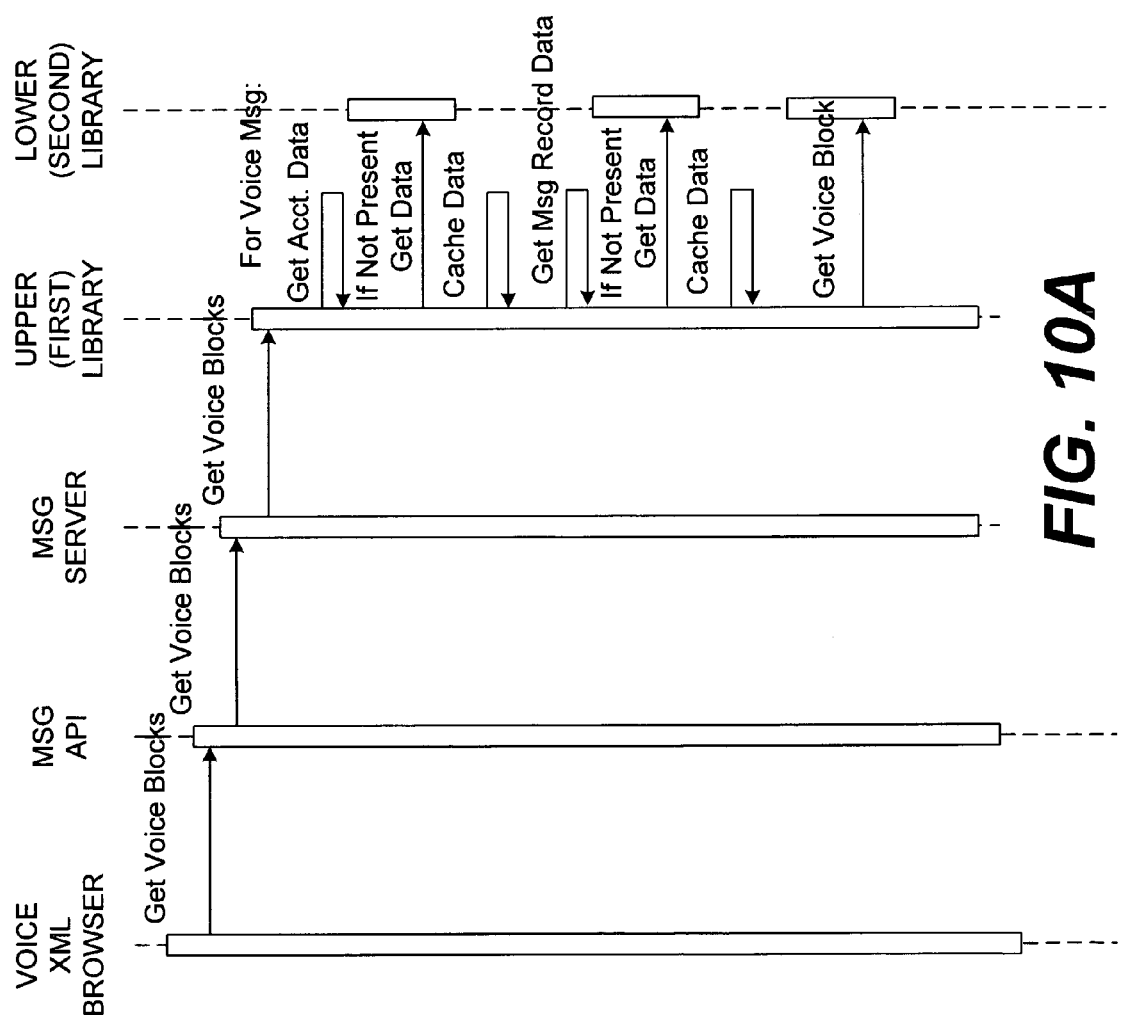
FIGS. 10A and 10B are a datagram illustrating an embodiment of message flow through the system of FIG. 1 during message retrieval.
Figure 10B:
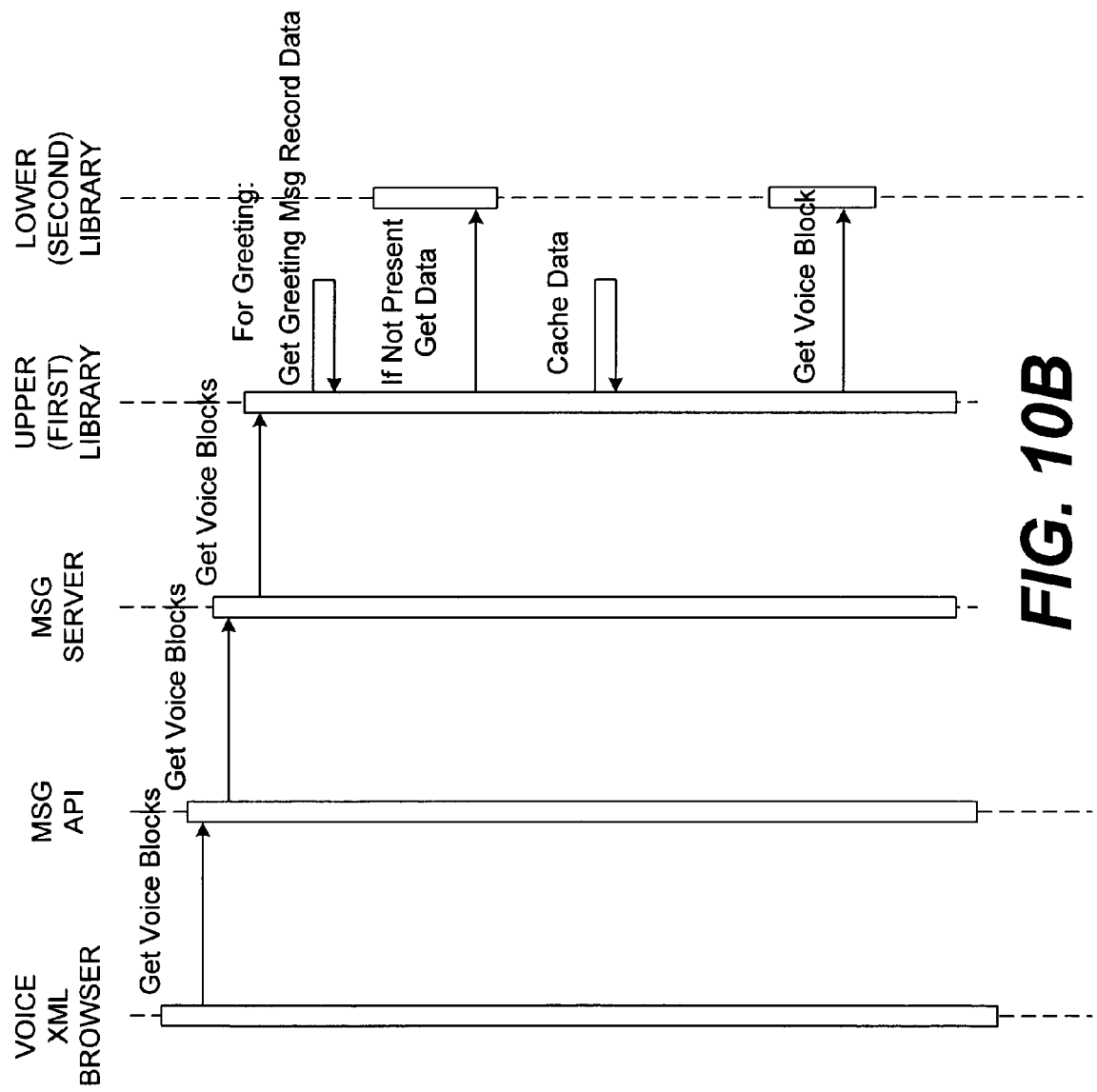

FIGS. 10A and 10B are a datagram illustrating an embodiment of message flow through the distributed messaging system 100 of FIG. 1 during message or greeting retrieval from common message store 170. As shown in the sample embodiment, a host of communications are sent and received by various system entities. A VXML browser initiates a request to get voice message blocks which is forwarded via a message application and message server to an upper or first library. When the request is for voice message blocks, the upper library 312 responds to the request by issuing a get account data process. If the account data is not available in the upper library 312, the upper library 312 forwards a request to get the account data from the lower or second library 314. The upper library 312 caches the account data returned from the lower library 314. Thereafter, the upper library 312 uses the cached account data to issue a request for message record data. If the message record data is not available in the upper library 312, the upper library 312 forwards a request to the record data from the lower library 314. Thereafter, the upper library 312 uses the record data to generate a request for a voice block. Not illustrated but implied by the datagram, the lower library 314 responds by forwarding the identified voice block from the common message store which is returned to the VXML browser 224 via the upper library 312, and message server 264 in that order.

When the request is for a greeting, the upper library 312 responds to the request by issuing a get greeting message data process. If the greeting message data is not present in the upper library 312, the upper library 312 forwards a request to get the greeting message data from the lower or second library 314. The upper library 312 caches the greeting message data returned from the lower library 314. Thereafter, the upper library 312 uses the cached greeting message data to issue a request for a voice block that includes the greeting. Not illustrated but implied by the datagram, the lower library 314 responds by forwarding the identified voice block from the common message store which is returned to the VXML browser 224 via the upper library 312, and message server 264.

Figure 11:
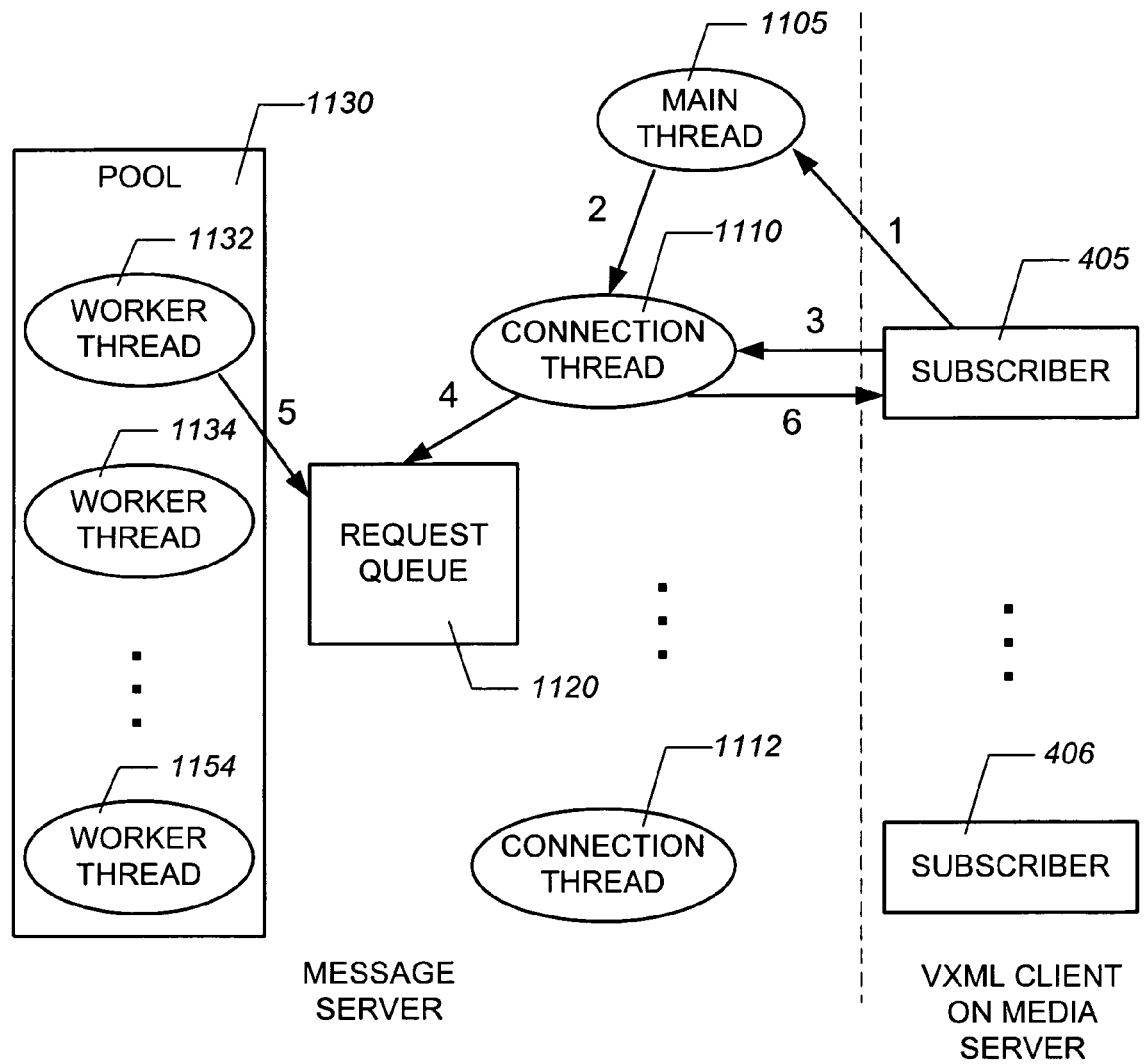
FIG. 11 is a schematic diagram illustrating operation of the message server and VXML browser of FIG. 2.

FIG. 11 is a schematic diagram illustrating operation of the message server 264 and VXML browser 224 of FIG. 2. Message server 264 provides asynchronous message retrieval from a coupled common message store 170 as described above to one or more subscribers, such as subscriber 405. Message information retrieval is asynchronous as there is no timing requirement for the transmission of each individual block of message information that forms the voice message. To enable clear playback of retrieved messages, the VXML browser 224 can be configured to buffer a plurality of blocks of message information before starting an audio rendition of the message.

As indicated by flow control arrow "1" in FIG. 11, subscriber 405 communicates a request to open a connection with the message server 264 using VXML browser 224. The request to open a connection is serviced by main thread 1105, which opens connection thread 1110 as indicated by flow control arrow "2." Once connection thread 1110 is available, subscriber 405, using the VXML browser 224 issues a request for voice message information as shown by flow control arrow "3." Thereafter, connection thread 1110 forwards the request for voice message information to request queue 1120 as indicated by flow control arrow "4." Pool 1130, which comprises a plurality of worker threads such as worker thread 1132, worker thread 1134, and worker thread 1154 is configured to remove the request from a request queue and process the requests for voice message information. Each of the worker threads 1132, 1134, through 1154 are configured to interface with common message store 170 (not shown) by invoking functions resident in the upper library 312 to process the various requests for voice message information. The number of worker threads available in pool 1130 is adjustable to control possible loads on lower library 314 and common message store 170. Flow control arrow "5" is indicative of removing and processing a request from request queue 1120. Note that retrieved message blocks are sent via connection thread 1110 to subscriber 405 via the VXML browser. Request queue 1120 includes a mechanism for managing and processing requests. Thereafter, as indicated by flow control arrow "6," connection thread 1110 forwards retrieved message information back to the requesting subscriber 405 via VXML browser 405. Flow control arrow "3" and flow control arrow "6" are representative of a socket connection generated between VXML browser 224 and message server 264 as a result of the initial request to open a connection.

As further indicated in the diagram of FIG. 11, the streaming channel formed by the message server 264 and media server 120 is scalable to support multiple subscribers (e.g., subscriber 405 and subscriber 406) using multiple connection threads (e.g., connection thread 1110 and connection thread 1112). Alternatively, a single connection thread can be used to support requests from two or more subscribers. In these embodiments, the connection thread uses a mechanism for locking out or otherwise blocking requests from all but an initial subscriber until the requested message information has been transferred.

Figure 12:
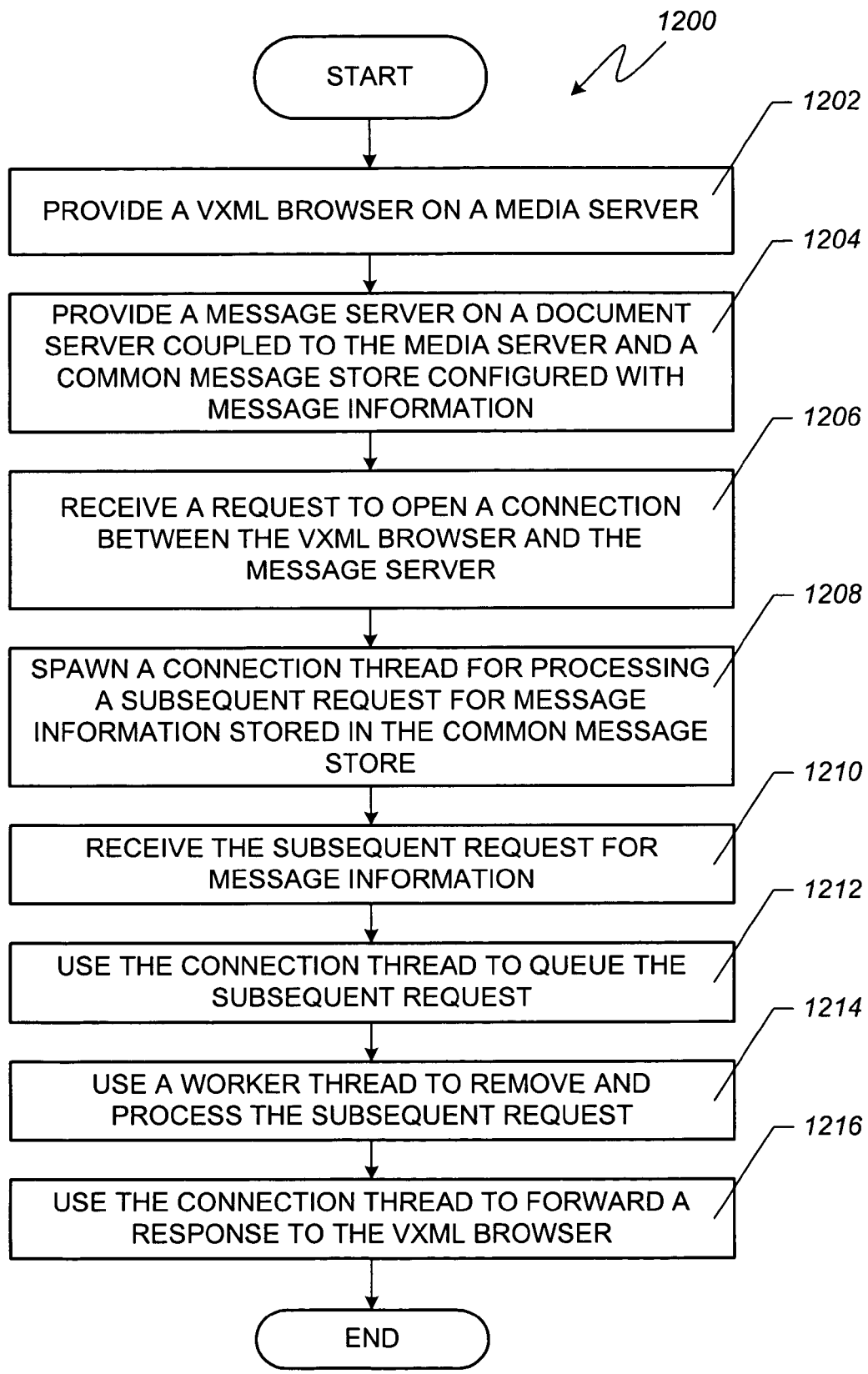
FIG. 12 is a flow diagram illustrating an embodiment of a method for streaming audio information that can be implemented by the geographically distributed messaging system of FIG. 1.

FIG. 12 is a flow diagram illustrating an embodiment of a method for streaming audio information 1200 that can be implemented by the geographically distributed messaging system of FIG. 1. As illustrated in FIG. 12, method 1200 begins with block 1202 where a VXML browser is provided on a media server. In block 1204, a message server is provided on a document server that is coupled to the media server and a common message store configured with stored message information. Thereafter, as indicated in block 1206, a subscriber request to open a connection between the VXML browser and the message server is received. In block 1208, the message server responds by spawning a connection thread for processing a subsequent request for message information (e.g., blocks) stored in the common message store. Next, as indicated in block 1210, the message server receives a subsequent request for message information. In block 1212, the message server uses the connection thread to queue the subsequent request. Thereafter, as indicated in block 1214, the message server uses a worker thread to remove the request from a queue and process the subsequent request. The message server forwards retrieved message information to the VXML browser via the connection thread as shown in block 1216.

The flow diagrams of FIGS. 6, 7, 8A-8B, and 12 and the datagrams of FIGS. 9A, 9B, 10A, and 10B show the architecture, functionality, and operation of a possible implementation via software and or firmware associated with a host of communicatively coupled hardware devices that causes the process of collection, integration and distribution of voice-based messages. In this regard, each block represents a module, segment, or portion of code, which comprises one or more executable instructions for implementing the specified logical function(s). It should also be noted that in some alternative implementations, the functions noted in the blocks may occur out of the order noted in the drawings. For example, two blocks shown in succession in the flow diagram of FIG. 8B may in fact be executed substantially concurrently or the blocks may sometimes be executed in the reverse order, depending upon the functionality involved.

The operational software programs that may be used by the various devices of the distributed messaging system 100, as well as operational software that may be used in conjunction with the VXML browser, telephonic devices, and applications that interface with distributed messaging system 100, which comprise an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device.

The computer-readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via, for instance, optical scanning of the paper or other medium, then compiled, interpreted or otherwise processed in a suitable manner if necessary, and then stored in a computer memory.

While various embodiments of the message retrieval subsystem systems and associated methods have been described, it will be apparent to those of ordinary skill in the art that many more embodiments and implementations are possible that are within the scope of the accompanying claims. Accordingly, the systems and methods for message retrieval are not to be restricted beyond the attached claims and their equivalents.

What is claimed is:

1. A message retrieval subsystem that provides streaming audio in a distributed voice messaging system, the subsystem comprising:
    a voice extensible mark-up language browser having an application programming interface;
    a message server communicatively coupled to the application programming interface, the message server configured to receive a request to open a connection from a client process operative on the voice extensible mark-up language browser, spawn a thread to enable the connection, use the thread to queue one or more subscriber requests for respective blocks of audio information, remove the one or more subscriber requests from the queue, process the one or more subscriber requests, and use the thread to forward a retrieved block of audio information to a subscriber; and
    a message library comprising:
        an upper library having an interface that encapsulates device-specific logic; and
        a lower library having an interface in communication with a storage device under the management and control of a message store, wherein the upper library is communicatively coupled to the message server, interposed between the message server and the lower library, and isolates the voice extensible mark-up language browser from a streaming protocol used to access a stored message.

2. The message retrieval subsystem of claim 1, wherein the message server provides asynchronous message retrieval.

3. The message retrieval subsystem of claim 1, wherein the message server is configured to invoke upper library functions.

4. The message retrieval subsystem of claim 1, wherein the message server provides a socket connection for the voice extensible mark-up language browser.

5. The message retrieval subsystem of claim 1, further comprising:
    a message manager configured to acknowledge a message delivery status.

6. The message retrieval subsystem of claim 1, further comprising:
    a layered service provider server interposed between the message server and the message library.

7. The message retrieval subsystem of claim 6, wherein the layered service provider server is configured to receive Internet Inter-Operable Protocol communications.

8. The message retrieval subsystem of claim 1, wherein the message library hides a streaming protocol from the voice extensible mark-up language browser.

9. The message retrieval subsystem of claim 1, wherein the message server is configured to spawn a process to manage retrieval of a message that comprises a greeting.

10. The message retrieval subsystem of claim 1, wherein the message server is configured to spawn a set of worker threads responsible for retrieving voice blocks by invoking the upper library.

11. The message retrieval subsystem of claim 10, wherein a number of members of the set is adjustable for controlling the load to the lower library and the common message store.

* * * * *